Aug. 8, 1933.  N. LUCCHESI  1,921,627

ROPE BRAKE AND LOCK

Filed April 25, 1931  2 Sheets-Sheet 1

INVENTOR.
Napoleon Lucchesi.
BY Townsend, Loftus & Abbett.
ATTORNEYS.

Aug. 8, 1933.  N. LUCCHESI  1,921,627
ROPE BRAKE AND LOCK
Filed April 25, 1931  2 Sheets-Sheet 2
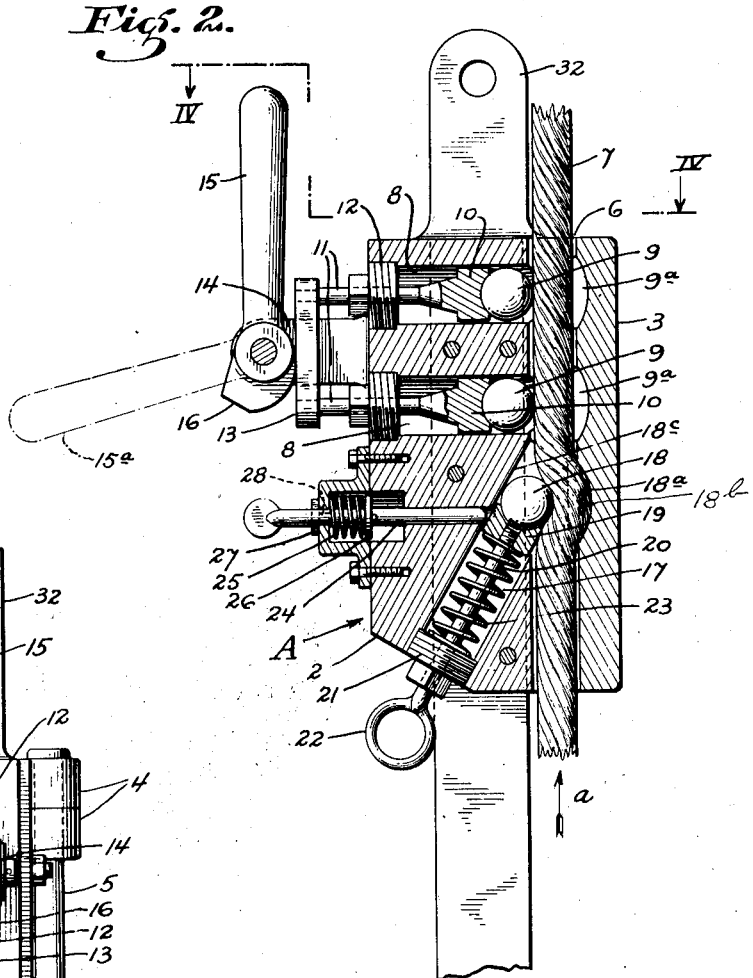
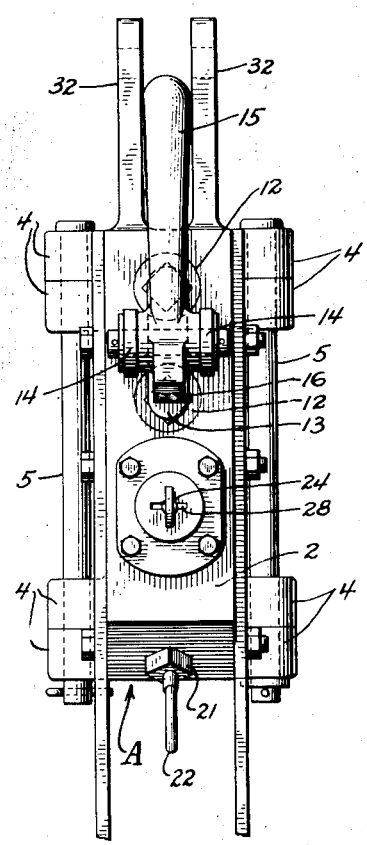
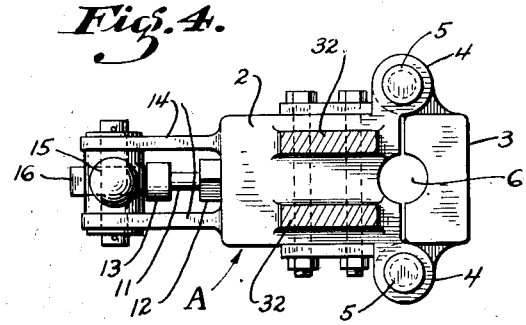
INVENTOR.
Napoleon Lucchesi.
BY
Townsend, Loftus & Abbett.
ATTORNEYS.

Patented Aug. 8, 1933

1,921,627

UNITED STATES PATENT OFFICE 1,921,627

ROPE BRAKE AND LOCK

Napoleon Lucchesi, San Francisco, Calif.

Application April 25, 1931. Serial No. 532,770

5 Claims. (Cl. 188—65)

This invention relates to a rope brake and lock which is particularly intended to facilitate the handling and support of scaffolds when hung by means of ropes or cables from the roof of a building.

The object of the present invention is to generally improve and simplify the construction and operation of rope brakes and locks; to provide a rope brake and lock which may be quickly and readily applied to a rope or cable; to provide a brake mechanism which is manually operable when descending on a rope or cable; to provide means for automatically gripping and locking the device with relation to the cable to stop descent in case of accidents, or otherwise; and, further, to provide means for manually releasing the automatic gripping or locking device when descending under brake control.

The rope brake and locking device is shown by way of illustration in the accompanying drawings, in which—

Fig. 2 is a central, vertical section of the rope brake and lock.

Fig. 3 is a front view of the same.

Fig. 4 is an end view partially in section taken on line IV—IV of Fig. 2.

Figure 1:
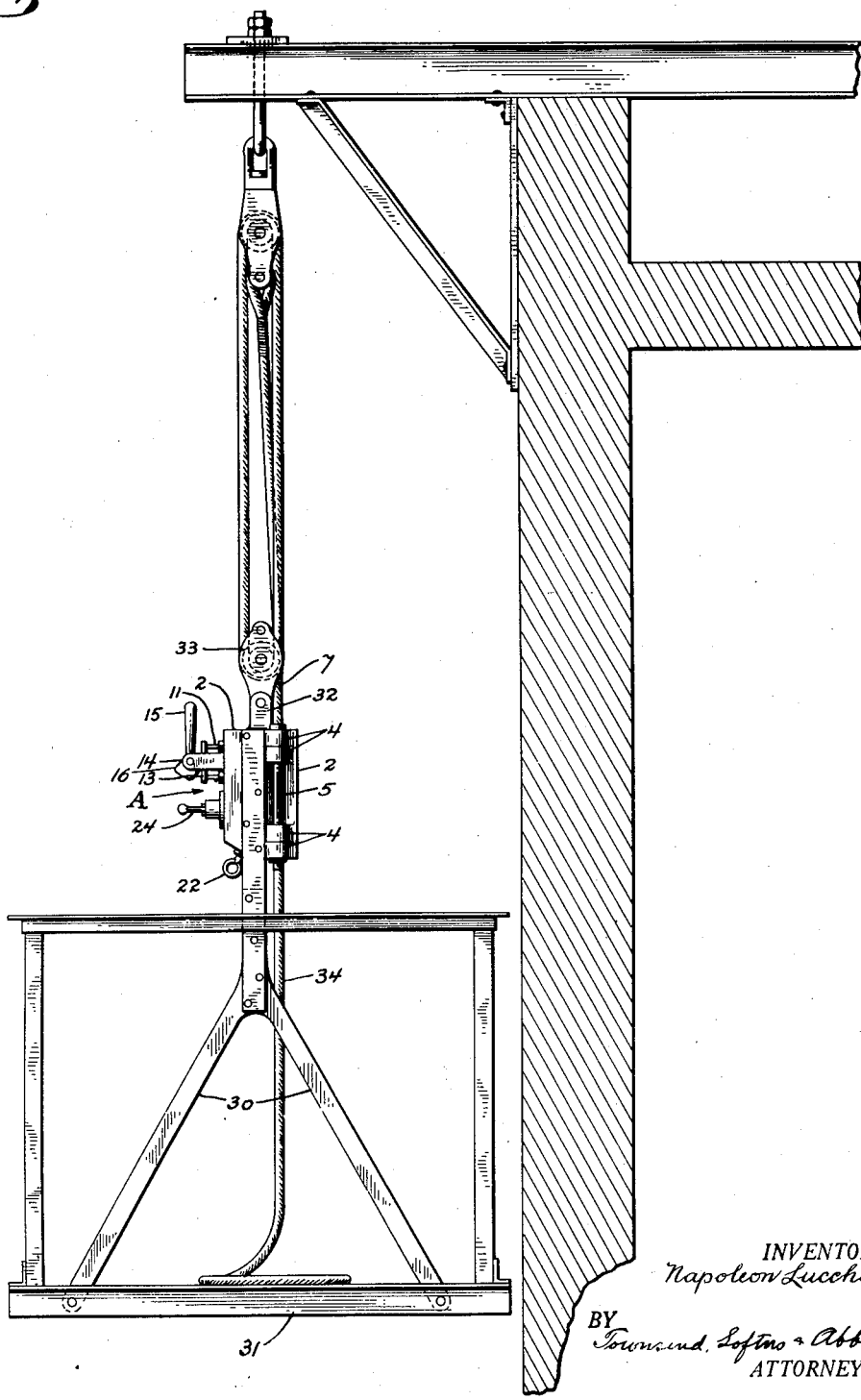
Fig. 1 is a side elevation showing the device used in conjunction with a scaffold.

Referring to the drawings in detail and particularly Figs. 2 to 4, inclusive, A indicates in general a housing which, in this instance, is divided into two sections indicated at 2 and 3. Lugs 4 are formed on the respective sections and pins 5 are insertable through the lugs to secure the sections with relation to each other. Formed between the sections 2 and 3 is a rope or cable passage 6 adapted to receive a rope or cable such as shown at 7. Formed in the upper portion of the housing section 2 are a pair of passages 8. Mounted in each passage is a ball 9 and disposed behind each ball is a shoe 10. The shoes are provided with rod-like extensions 11 which extend through bearings 12 and the rods are connected at their outer ends by means of a plate 13. Pivotally mounted in lugs 14 is a lever 15 and formed on the inner end thereof is a cam 16 engageable with the plate 13.

Formed in the lower portion of the housing section 2 is an upwardly extending angularly disposed passage 17, and mounted therein is a ball 18 and a shoe 19 having a rod 20 secured thereto. This rod extends through a bearing 21 and is provided with an eye or handle extension 22. A spring 23 is interposed between the shoe and the bearing 21 and this normally urges the shoe and the ball into engagement with the cable as shown in Fig. 2. The mechanism last described will hereinafter be referred to as the automatic gripping or locking device.

Formed in the housing section 3 are depressions such as indicated at 9a and 18a. These depressions cooperate with the respective balls 9 and 18 and permit bending of the cable as shown at 18b when engagement is made between the balls and the cable. Under certain conditions it may be desirable to secure the ball 18 and shoe 19 in depressed or retracted position and a locking or latching pin 24 is provided for this purpose. It is normally urged in an inward direction by means of a spring 25 engaging a collar 26 but it may be secured or locked in the retracted position shown in Fig. 2 by means of a pin 27. By rotating the latch 24 a half revolution pin 27 will align with a slot 28 and when this alignment is secured the latch is forced inwardly by the spring 25, but when manually retracted so that the pin 27 extends beyond the slot 28 and then turned the latch is secured in retracted position.

In actual operation the device shown may be used for numerous purposes; for instance, it might be used as a fire escape when descending from a burning building. It may be used on farms for lowering heavy weights, like bales of hay from lofts and the like, or it may be used as a scaffold support as shown in Fig. 1. In this drawing it will be noted that the housing is provided with downwardly extending arms 30 and that these support a scaffold as shown at 31. The upper end of the housing is provided with a pair of lugs 32 and these are connected with a pulley block 33. Where the device is used as a scaffold support it is hung from the parapet wall of a building in the manner illustrated or by any other suitable supporting mechanism. If the workmen on the scaffold desire to hoist or pull themselves in an upward direction they merely grasp the loose end of the cable indicated at 34 and pull upwardly. Under those conditions ball 18 recedes into the passage 17 and does not interfere with the free pulling of the cable. On the other hand, if the workmen hauling on the cable should accidentally release it or something of a similar nature should happen the ball 18 is always maintained in frictional contact with the cable and as such would instantly grip and lock the cable the moment it was freed or started to run through the housing in the opposite direction, or that indicated by arrow $a$. The gripping action of the ball 18 is more than sufficient to lock the cable regardless of the load applied as it is frictionally engaged by the rope on one side and runs up an inclined surface 18c on the other side. In running up the surface it bends or deflects the cable into the depression 18a and as such imposes such a frictional resistance as to positively grip and lock the cable.

If the scaffold is at a high point on the building and it is desired to lower the same it is accomplished by pulling downward on the handle 15 until it assumes the dotted line position shown at 15a. The cam 16 will during such movement engage the plate 13 and force the rods 11 together with the shoes 10 and the balls 9 inwardly in the passage 8, thus bringing the balls into forceful engagement with the cable and bending the cable into the depressions 9a. The balls 9 due to the high pressure applied by the cam 16 will tend to flatten the cable and positively lock it in the depressions 9a. The operator next grasps the eye 22 or the rod 20 and pulls it in a downward direction so as to release the ball 18 with relation to the cable. Then by slightly relieving the pressure on the balls 9, by swinging the lever or handle 15a upwardly, the pressure of the balls 9 on the cable is released and the scaffold will begin to descend, the speed of descent being controlled directly by the operator and being proportional to the amount of friction or pressure imposed upon the balls 9 and cable 7. It should be remembered that when the operator is descending by brake action that he is forced to hold the ball 18 out of engagement with the cable by pulling downwardly on the eye 22. If during descent he should accidentally release the lever 15a, or if he should faint or otherwise become incapacitated, he would naturally release the eye 22 hence ball 18 would instantly be urged inwardly by spring 20 and the shoe 19 and the cable would thus automatically be gripped and locked thus stopping further descent.

In view of the foregoing it can be seen that a safe, reliable, practical mechanism has been provided for use in conjunction with a rope tackle or the like for ascending and descending cables. If the device is to be used as a fire escape, a chair or seat will be attached to the downwardly extending arms 30 in which the person can sit during descent of a cable. In that case, a person descending can actuate the brake mechanism through lever 15 to descend as fast or as slow as desired. It should also be noted that the housing A is divided into two sections as indicated at 2 and 3 as previously described. This is also important as it permits the device to be attached to a cable at any time and at any point on the cable merely by releasing or pulling out one of the pins 5. The housing section 3 can be swung open about the other lugs and pin as a hinge and when in the open position it can be applied to a cable and the section 3 is then closed and the pin inserted.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus desribed my invention, what I claim and desire to secure by Letters Patent is—

1. A device of the character described comprising a housing having a passage formed therein for the reception of a cable, said housing having a second passage formed therein and disposed at an acute angle to the first named passage, and a spring actuated braking member disposed in the second passage and engageable with the cable in the first named passage to secure the cable against movement in one direction, said means permitting free movement of the cable in the opposite direction.

2. A device of the character described comprising a housing having a passage formed therein for the reception of a cable, said housing having a second passage formed therein and disposed at an acute angle to the first named passage, a spring actuated braking member disposed in the second passage and engageable with the cable in the first named passage to secure the cable against movement in one direction, said means permitting free movement of the cable in the opposite direction, and manually actuated means for releasing said braking means.

3. A device of the character described comprising a housing having a passage formed therein for the reception of a cable, said housing having a second passage formed therein and disposed at an acute angle to the first named passage, a ball disposed in the second named passage, a shoe engaging the said ball, spring means engageable with the shoe to maintain the ball in engagement with the cable in the first named passage, said spring means, shoe and ball securing the cable against movement in one direction and permitting free movement of the cable in an opposite direction, and a rod connected with the shoe and having a handle whereby it may be grasped to retract the shoe so as to release pressure on the ball and thereby permit free movement of the cable in either direction.

4. A device of the character described comprising a housing having a passage formed therein for the reception of a cable, said housing having a second passage formed therein and disposed at an acute angle to the first named passage, a ball disposed in the second named passage, a shoe engaging the said ball, spring means engageable with the shoe to maintain the ball in engagement with the cable in the first named passage, said spring means, shoe and ball securing the cable against movement in one direction and permitting free movement of the cable in an opposite direction, a rod connected with the shoe and having a handle whereby it may be grasped to retract the shoe so as to release pressure on the ball and thereby permit free movement of the cable in either direction, and a latch for securing the ball in released position.

5. A device of the character described comprising a housing having a passage formed therein for the reception of a cable, a pair of balls engageable with one side of the cable, shoes engaging the balls, a plate connected with the shoes, a lever pivotally mounted on the housing, and a cam on the lever engageable with the plate to force the shoes and the balls inwardly against the cable to exert a braking action thereon.

NAPOLEON LUCCHESI.